(12) United States Patent
Fischer et al.

(10) Patent No.: US 6,618,183 B2
(45) Date of Patent: Sep. 9, 2003

(54) METHOD AND APPARATUS FOR MODULATING UNPOLARIZED LIGHT

(75) Inventors: Joerg-Achim Fischer, Laboe (DE); Axel Gebhardt, Moenkeberg (DE); Peter Ressel, Schoenkirchen (DE)

(73) Assignee: Heidelberger Druckmaschinen Aktiengesellschaft, Kiel (DE)

( * ) Notice: Subject to any disclaimer, the term of this patent is extended or adjusted under 35 U.S.C. 154(b) by 0 days.

(21) Appl. No.: 10/021,326

(22) Filed: Oct. 30, 2001

(65) Prior Publication Data

US 2002/0063942 A1 May 30, 2002

(30) Foreign Application Priority Data

Nov. 28, 2000 (DE) .......................... 100 58 999

(51) Int. Cl.[7] .................................. G02F 1/11
(52) U.S. Cl. ..................... 359/286; 359/281; 359/283
(58) Field of Search .................... 359/246, 281, 359/282, 83, 286, 320, 321, 322, 323, 578, 251, 254, 255, 319, 316, 256

(56) References Cited

U.S. PATENT DOCUMENTS

| | | | |
|---|---|---|---|
| 3,938,881 A | * 2/1976 | Biegelsen et al. | 264/1.31 |
| 4,291,939 A | * 9/1981 | Giallorenzi et al. | 359/245 |
| 5,251,058 A | 10/1993 | MacArthur | 359/249 |
| 5,363,228 A | * 11/1994 | DeJule et al. | 359/117 |
| 5,883,734 A | * 3/1999 | Suzuki et al. | 359/320 |
| 5,949,925 A | * 9/1999 | Seino | 385/1 |
| 6,008,930 A | 12/1999 | Nishikawa et al. | 359/285 |
| 6,016,216 A | * 1/2000 | Chang | 359/285 |
| 6,025,864 A | 2/2000 | Nashimoto | 347/243 |
| 6,141,069 A | * 10/2000 | Sharp et al. | 349/89 |
| 6,204,952 B1 | 3/2001 | Hinkov et al. | 359/245 |
| 2002/0159151 A1 | * 10/2002 | Li | 359/498 |

FOREIGN PATENT DOCUMENTS

| | | |
|---|---|---|
| DE | 198 40 926 | 4/2000 |
| EP | 690 28 270 T2 | 2/1997 |
| EP | 0 866 357 | 9/1998 |
| WO | WO 98/18045 | 4/1998 |

OTHER PUBLICATIONS

Acousto–optically Switched Optical Delay Lines—Riza—Optics Communications 145 (1998) 15–20.
Focused Acoustic Wave Acousto–optic Device Using a Planar Domain–inverted Lithium Niobate Transducer—Optics Communications 144 (1997) 161–164—Lawrow et al.

* cited by examiner

Primary Examiner—Ricky Mack
Assistant Examiner—Brandi N Thomas
(74) Attorney, Agent, or Firm—Schiff Hardin & Waite

(57) ABSTRACT

The method and apparatus for amplitude modulation of unpolarized light by at least one Bragg modulator on the basis of domain-invertible material, the unpolarized light is modulated by a first Bragg modulator both for defining a polarization plane in the unpolarized light and for modulating a light part to be allocated to the polarization plane. A second Bragg modulator is provided which modulates the light part of the unpolarized light allocated to the polarization plane orthogonal to the polarization plane of the first Bragg modulator. The method and apparatus are particularly useful for recording a product to be printed, such as for manufacturing printing forms.

18 Claims, 2 Drawing Sheets

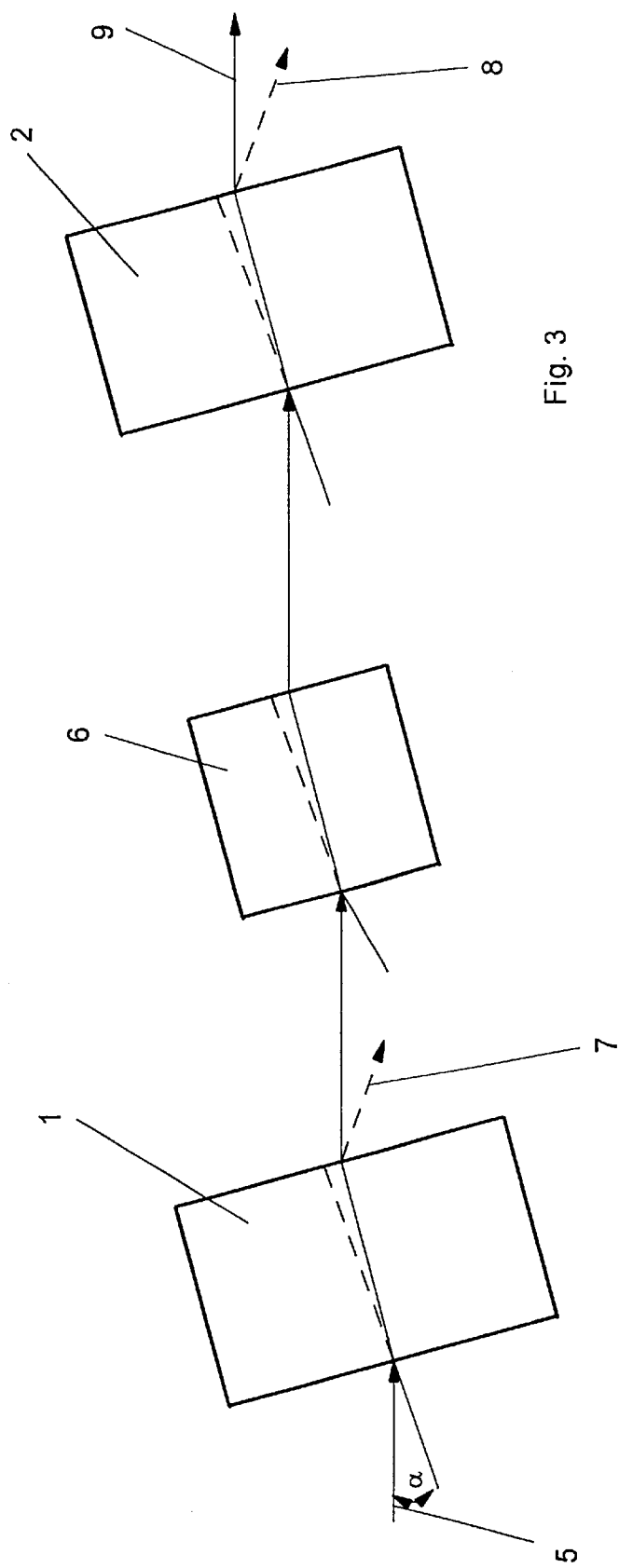

METHOD AND APPARATUS FOR MODULATING UNPOLARIZED LIGHT

BACKGROUND OF THE INVENTION

The present invention is generally directed to a method for modulation, particularly amplitude modulation, of light by a Bragg modulator. In particular, the present invention is directed to a method and apparatus for recording a product to be printed, preferably for the manufacture of printed forms, involving at least one Bragg modulator on the basis of domain-invertible material.

Employing a Bragg modulator on the basis of domain-inversion for recording a product to be printed, is fundamentally known from U.S. Pat. No. 6,025,864, namely as a component part of a scanner.

In addition, utilizing fiber lasers for manufacturing printing forms is known from DE-A-198 40 926.

It is well known that fiber lasers output unpolarized light. Using Bragg modulators for the light from fiber lasers, or for other unpolarized light, seems problematical because the index of diffraction of the diffraction grating generated by an electrical voltage and changed due to domain-inversion, acts on only one polarization direction or in one polarization plane. An acousto-optical device is therefore usually used for the modulation of unpolarized light.

SUMMARY OF THE INVENTION

It is an object of the invention to provide a method and an apparatus wherein a Bragg modulator can be used to modulate unpolarized light.

It is a further object of the present invention to use a first Bragg modulator to modulate a light part of unpolarized light in a polarization plane defined by its orientation.

It is another object of the invention to use a second Bragg modulator to modulate the light part of unpolarized light to be assigned to a second polarization plane orthogonal to a first polarization plane.

It is a further object of the invention to modulate light independently of its polarization planes, so that an acousto-optical modulator is not needed.

Using Bragg modulators for modulating unpolarized light in this way has many advantages. For one thing, modulation is possible with high efficiency such as on the order of magnitude of about 99%. For another thing, the efficiency and the modulation speed are advantageously not fundamentally interdependent. In addition, the laser beam can have a relatively large beam diameter, even given high modulation speeds. Since the beam diameter can be large, the power density in the crystal of the modulator can be relatively low. It in turn follows that fiber lasers can be used for manufacturing printing forms.

The two Bragg modulators are situated such that, for two mutually orthogonal polarization planes of the unpolarized light, the modulators are arranged following one another on the light path.

For the modulators to act on the two polarization planes of the light, the light between the modulators can be turned by 90° with a λ/2 plate, and the modulators themselves can be arranged with their gratings parallel to one another, or the modulators can be arranged relative to one another with their gratings turned by 90° around the beam axis of the light. Arranging gratings in parallel, allows a planar structure of the modulator unit.

Exemplary embodiments, from which further inventive features also derive but that do not limit the invention, are shown in the drawings.

BRIEF DESCRIPTION OF THE DRAWINGS

FIG. 3 shows a plan view of the modulator device of the present invention shown in FIG. 1.

DESCRIPTION OF THE PREFERRED EMBODIMENTS

Figure 1:
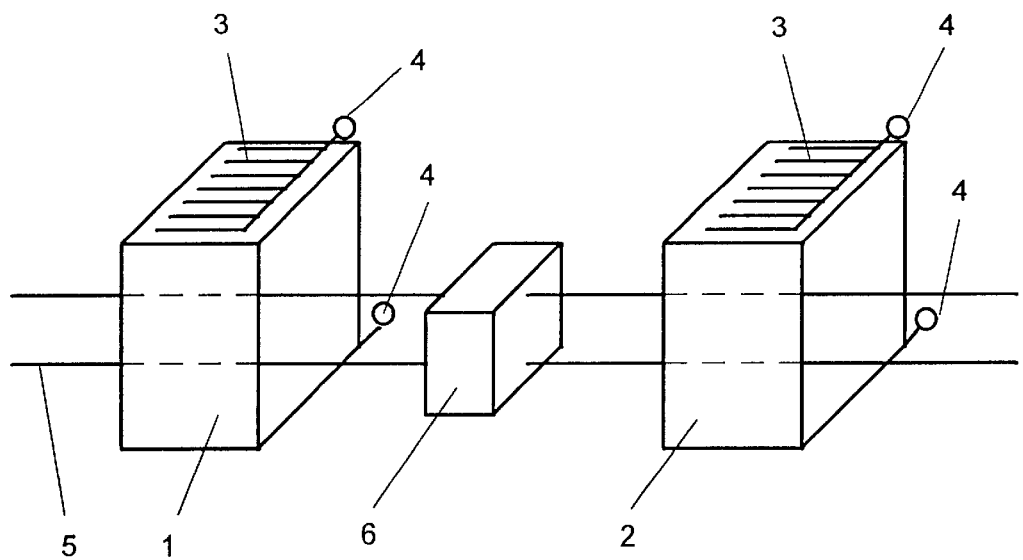
FIG. 1 shows a perspective view of a modulator device with a λ/2 plate according to the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows a perspective view of a first embodiment of a modulator device for modulating unpolarized light according to the present invention.

The modulator device of the present invention comprises two Bragg modulators 1, 2 that use a crystal of $LiNbO_3$, to enable generation of a diffraction grating on the basis of domain-inversion by way of electrical drive. For this electrical drive, the Bragg modulators 1, 2 have two surfaces lying opposite one another provided with comb-shaped electrodes 3 that can be supplied with an electrical voltage via terminals 4. The grating formation and orientation of the diffraction gratings of the Bragg modulators 1, 2 are thereby prescribed by the electrode arrangement.

Gratings of the two Bragg modulators 1, 2 are arranged following one another and are oriented parallel to one another therein. Each Bragg modulator 1, 2, has its grating exerting a diffracting effect in only one polarization plane. Bragg modulator 1 therefore distinguishes one of the possible polarization planes in the unpolarized light and a first diffraction is effected, with only that part of the incident light 5 allocated to this polarization plane being affected.

A λ/2 plate 6 that turns the light 5 around its beam axis by 90°, in view of its polarization planes or directions, is arranged between the first Bragg modulator 1 and the second Bragg modulator 2. Although the Bragg modulators 1, 2 are arranged following one another so as to have their gratings aligned parallel to one another, the second Bragg modulator 2, after the rotation of the light 5 by the λ/2 plate 6, acts in the second polarization plane of light 5 that is orthogonal to it, or rotated by 90°, relative to the first polarization plane of the light 5 marked by the first Bragg modulator 1.

Figure 2:
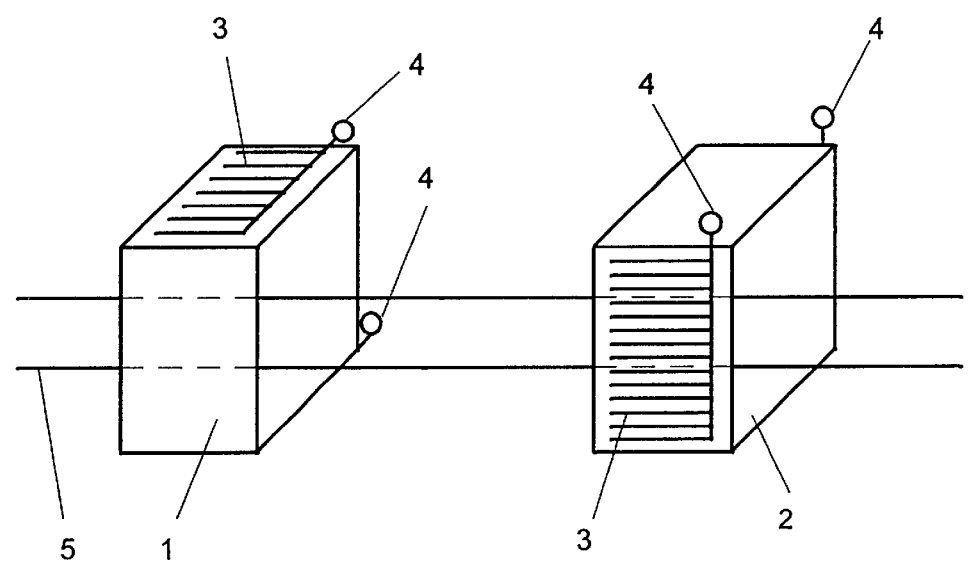
FIG. 2 shows a perspective view of a modulator device according to the present invention.

In FIG. 2, the λ/2 plate 6 is lacking in the second embodiment of a modulator device. Instead, Bragg modulators 1, 2 have their gratings rotated by 90° relative to one another, around the beam axis of light 5, so that the modulators 1, 2 act in two polarization planes of the light 5 that are orthogonally oriented relative to one another.

FIG. 3 shows a plan view of the modulator device of the present invention shown in FIG. 1.

According to FIG. 3, the two Bragg modulators 1, 2 are oriented relative to one another and to light 5, which upon entry into the respective Bragg modulator 1 or 2, meets what is referred to as the Bragg condition at which desired diffraction of the light is produced that is dependent on the angle of incidence a of light 5.

FIG. 3 also shows that light parts 7, 8 are diffracted out of light 5 by each of the two Bragg modulators 1, 2, so that a light beam 9 that ultimately emerges, is correspondingly modulated. Light parts 7 and 8 that are diffracted out, also come into consideration for use.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim as our invention:

1. A method for modulating of light traveling along a light path on the basis of domain-invertible material to record a product to be printed, comprising the steps of:

defining a first polarization plane in the unpolarized light by modulating the unpolarized light with a first Bragg modulator based on said domain-invertible material therein, and for modulating a light part of the unpolarized light to be allocated to the first polarization plane; and using a second Bragg modulator based on said domain-invertible material therein to modulate a light part of the unpolarized light allocated to a second polarization plane, said second polarization plane being orthogonal to said first polarization plane.

2. The method according to claim 1, further comprising the step of arranging said first and second Bragg modulators to follow one another along the light path.

3. The method according to claim 2, further comprising the step of positioning a λ/2 plate between said first and second Bragg modulators.

4. The method according to claim 3, further comprising the step of turning grating of said first and second Bragg modulators by 90° around the light path relative to one another.

5. The method according to claim 4, wherein the unpolarized light is amplitude modulated.

6. An apparatus for modulating light traveling along a light path on the basis of domain-invertible material, comprising:

a first Bragg modulator based on said domain-invertible material that defines a first polarization plane in an unpolarized light and modulates a light part to be allocated to said first polarization plane; and a second Bragg modulator based on said domain-invertible material that modulates the light part of a unpolarized light to be allocated to a second polarization plane orthogonal to said first polarization plane, the light thus being modulated for recording a product to be printed.

7. The apparatus according to claim 6, wherein the first and second Bragg modulators are arranged to follow one another along the light path.

8. The apparatus according to claim 7 further comprising a λ/2 plate arranged between said first and second Bragg modulators.

9. The apparatus according to claim 8, wherein gratings of the first and second Bragg modulators are each turned by 90° around the light path relative to one another.

10. The apparatus according to claim 9, wherein the unpolarized light is amplitude modulated.

11. A method for modulation of light on the basis of domain-invertible material, comprising the steps of:

modulating unpolarized light by use of a first Bragg modulator based on said domain-invertible material for defining a first polarization plane in the unpolarized light and for modulating a light part to be allocated to said first polarization plane; and modulating with a second Bragg modulator based on said domain-invertible material a light part of the unpolarized light that is allocated to a second polarization plane orthogonal to the first polarization plane of the first Bragg modulator.

12. The method according to claim 11 where the modulation comprises amplitude modulation of the light.

13. The method according to claim 11 including the step of providing the method for modulation for recording of a product to be printed.

14. The method according to claim 13 for manufacture of printing forms.

15. A device for modulation of light on the basis of domain-invertible material, comprising:

a first Bragg modulator based on said domain-invertible material for defining a first polarization plane in an unpolarized light and for modulating a light part to be allocated to said first polarization plane; and a second Bragg modulator based on said domain-invertible material for modulating a light part of the unpolarized light allocated to a second polarization plane orthogonal to the first polarization plane of the first Bragg modulator.

16. The device according to claim 15 wherein the modulation comprises amplitude modulation.

17. The device according to claim 15 wherein the device is for recording of a product to be printed.

18. The device according to claim 17 wherein the device is for manufacture of printing forms.

* * * * *